US008706092B2

(12) United States Patent
Lee (10) Patent No.: US 8,706,092 B2
(45) Date of Patent: Apr. 22, 2014

(54) OUTGOING VOICE MAIL RECORDING AND PLAYBACK (75) Inventor: Michael M. Lee, San Jose, CA (US)

(73) Assignee: Apple Inc., Cupertino, CA (US)

(*) Notice: Subject to any disclaimer, the term of this patent is extended or adjusted under 35 U.S.C. 154(b) by 1523 days.

(21) Appl. No.: 12/006,617

(22) Filed: Jan. 3, 2008

(65) Prior Publication Data
US 2009/0175425 A1 Jul. 9, 2009

(51) Int. Cl.
*H04M 1/64* (2006.01)
*H04M 1/663* (2006.01)
*H04M 11/10* (2006.01)
*H04M 3/42* (2006.01)

(52) U.S. Cl.
USPC ............... 455/413; 455/414.1; 455/412.2; 379/88.12; 379/88.23; 379/70

(58) Field of Classification Search
CPC ... H04M 1/6505; H04M 3/537; H04M 3/533; H04M 3/436
USPC ........... 379/68, 88.23, 215.01, 393, 265, 266, 379/215, 87, 70, 74, 77, 162, 163, 204, 379/88.26, 88.22, 88.14, 67.1, 88.01, 88.04, 379/88.12, 88.13, 88.16, 88.18, 88.19, 88.2, 379/88.21, 207.04; 455/414.1, 412.1, 413, 455/455, 567, 412.2
See application file for complete search history.

(56) References Cited

U.S. PATENT DOCUMENTS

| | | | |
|---|---|---|---|
| 5,003,576 A * | 3/1991 | Helferich | 379/67.1 |
| 5,889,840 A * | 3/1999 | Lang et al. | 379/88.12 |
| 5,982,877 A * | 11/1999 | Nunokawa et al. | 379/357.02 |
| 6,222,909 B1 * | 4/2001 | Qua et al. | 379/88.22 |
| 6,269,151 B1 * | 7/2001 | Hanson | 379/69 |
| 6,584,178 B2 * | 6/2003 | Crockett et al. | 379/67.1 |
| 6,704,565 B1 * | 3/2004 | Parsons et al. | 455/414.1 |
| 7,082,141 B2 * | 7/2006 | Sharma et al. | 370/493 |
| 7,088,991 B2 * | 8/2006 | Nakajima | 455/412.1 |
| 7,133,503 B2 * | 11/2006 | Revisky et al. | 379/88.12 |
| 7,248,677 B2 * | 7/2007 | Randall et al. | 379/93.23 |
| 7,697,926 B2 * | 4/2010 | Brown et al. | 455/419 |
| 7,881,454 B2 * | 2/2011 | Tuchman et al. | 379/266.01 |
| 8,086,222 B2 * | 12/2011 | Vaananen | 455/412.1 |
| 8,447,285 B1 * | 5/2013 | Bladon et al. | 455/414.4 |
| 8,457,286 B2 * | 6/2013 | Lesher et al. | 379/88.23 |
| 2002/0039407 A1 * | 4/2002 | O'Donovan et al. | 379/67.1 |
| 2002/0115429 A1 * | 8/2002 | Deluca et al. | 455/413 |
| 2002/0115478 A1 * | 8/2002 | Fujisawa et al. | 455/567 |
| 2002/0128923 A1 * | 9/2002 | Dale | 705/26 |
| 2004/0034690 A1 * | 2/2004 | Schmitz | 709/206 |
| 2004/0196964 A1 * | 10/2004 | Bluvband | 379/88.13 |

(Continued)

OTHER PUBLICATIONS

Lee, Michael; Specification for U.S. Appl. No. 11/786,848.

*Primary Examiner* — Lisa Hashem
(74) *Attorney, Agent, or Firm* — Blakeley, Sokoloff, Taylor & Zafman LLP (57) ABSTRACT Systems and methods for enabling users to listen to outgoing voice mail messages are provided. These systems and methods record an audio file corresponding to a voice message being left by a user during an outgoing telephone call to a recipient, link the audio file to contact information associated with the recipient, and provide the user access to the audio file through, for example, playback of the audio included in the file. These systems and methods may be implemented through individual communications devices, such as an iPhone, through a telephone communications provider, or a combination of the same.

23 Claims, 3 Drawing Sheets

(56) References Cited

U.S. PATENT DOCUMENTS

| | | |
|---|---|---|
| 2004/0203651 A1* | 10/2004 | Qu et al. .................... 455/414.1 |
| 2004/0229600 A1* | 11/2004 | Saez et al. .................... 455/417 |
| 2005/0147227 A1* | 7/2005 | Chervirala et al. ...... 379/215.01 |
| 2005/0261034 A1* | 11/2005 | Punaganti et al. ............ 455/567 |
| 2006/0008060 A1* | 1/2006 | Memos ...................... 379/88.19 |
| 2006/0160530 A1* | 7/2006 | Tipley .......................... 455/418 |
| 2007/0041527 A1* | 2/2007 | Tuchman et al. .......... 379/88.22 |
| 2007/0130270 A1* | 6/2007 | Bobo ............................ 709/206 |
| 2007/0165790 A1* | 7/2007 | Taori ............................ 379/67.1 |
| 2007/0190987 A1* | 8/2007 | Vaananen ................. 455/414.1 |
| 2007/0291108 A1* | 12/2007 | Huber et al. ............... 348/14.02 |
| 2008/0056458 A1* | 3/2008 | Suito .......................... 379/88.11 |
| 2008/0147214 A1* | 6/2008 | Lee et al. ........................ 700/94 |
| 2008/0200152 A1* | 8/2008 | Moore .......................... 455/413 |
| 2008/0207176 A1* | 8/2008 | Brackbill et al. ............. 455/413 |
| 2008/0226040 A1* | 9/2008 | Liu et al. ..................... 379/67.1 |
| 2008/0254773 A1* | 10/2008 | Lee ........................... 455/414.1 |
| 2008/0260122 A1* | 10/2008 | Conway et al. .......... 379/112.01 |
| 2008/0261564 A1* | 10/2008 | Logan .......................... 455/413 |
| 2009/0010415 A1* | 1/2009 | Ustby ...................... 379/215.01 |
| 2009/0061827 A1* | 3/2009 | Bulgin et al. ................. 455/413 |
| 2009/0089390 A1* | 4/2009 | Fein et al. ..................... 709/207 |
| 2009/0154668 A1* | 6/2009 | Hao et al. ................... 379/88.18 |
| 2009/0172118 A1* | 7/2009 | Lee et al. ...................... 709/206 |
| 2009/0175425 A1* | 7/2009 | Lee ........................... 379/88.11 |
| 2009/0253413 A1* | 10/2009 | Sigmund et al. .............. 455/413 |
| 2009/0264107 A1* | 10/2009 | Selby ............................ 455/413 |
| 2009/0323905 A1* | 12/2009 | Fields et al. .................... 379/52 |
| 2010/0029251 A1* | 2/2010 | McConnell et al. .......... 455/413 |
| 2010/0099385 A1* | 4/2010 | Mousseau ................. 455/412.2 |
| 2010/0159889 A1* | 6/2010 | Sigmund et al. .............. 455/413 |
| 2010/0166161 A1* | 7/2010 | Dhawan et al. ............ 379/88.19 |
| 2010/0246783 A1* | 9/2010 | Rose et al. ................. 379/88.12 |
| 2011/0130122 A1* | 6/2011 | Lee et al. ...................... 455/413 |
| 2011/0151852 A1* | 6/2011 | Olincy et al. ................. 455/418 |
| 2011/0190012 A1* | 8/2011 | Williams ...................... 455/466 |
| 2011/0263228 A1* | 10/2011 | Selby ............................ 455/413 |
| 2012/0276877 A1* | 11/2012 | Balannik et al. ........... 455/412.2 |
| 2012/0309362 A1* | 12/2012 | Lee et al. ...................... 455/413 |
| 2013/0324092 A1* | 12/2013 | Scott ............................ 455/413 |

* cited by examiner

OUTGOING VOICE MAIL RECORDING AND PLAYBACK

BACKGROUND OF THE INVENTION

This invention relates generally to communications devices, and, more particularly, to communications devices that record and playback outgoing voice mail messages.

There are an increasing number of modes of communication by which individuals may send and receive correspondence or messages. Individuals may send and receive audio messages, such as voice mail messages, or data messages, such as e-mails, text messages, or instant messages. Many modes of communication and messaging may be incorporated into a single communications device.

As individuals get busy and assume more responsibilities, they may often forget about messages they have sent to, or left with, other recipients. As a result, when a recipient attempts to get in touch with the sender in order to respond to a message, the sender may not recall the subject of the communication, especially when a message is left unattended for a prolonged period of time. Even worse, potentially, the message may go completely unaddressed whereby the recipient does not respond to the message at all and the sender forgets to follow up on his or her request.

With data messaging services such as e-mail, text messages and instant messages, there are mechanisms to track outgoing messages as well as the contents of such messages. For example, an individual may consult his or her outbox or sent items in order to not only view when messages were sent and to whom, but also to consult the subject and even the full contents of such messages. This functionality can be further enhanced by organizing messages such that they are permanently stored in different folders or directories that are more easily searchable. However, no comparable tracking mechanism is available for voice mail messages.

At best, callers may be able to consult their telephone logs to obtain information such as the time, date, duration, length and recipient of a particular call. Accordingly, if the sender has not somehow taken note of the purpose of the call or the subject of his or her voice mail message, that same sender may have permanently lost the ability to brush up on the subject without somehow soliciting this information from the recipient, or obtaining it through other indirect means, before having to answer, face or respond to the recipient. As a result, individuals contacted by someone responding to one of their messages may be faced with the embarrassing situation in which the individual is not prepared to discuss the subject brought to the attention of that same individual, whether at the time the call is returned or at a later time.

In other situations, as mentioned above, outstanding messages may go completely unaddressed. As a result, individuals may forgo professional opportunities (e.g., a broker reaping a commission on a sale) or miss personal matters (e.g, a husband wishing his wife a happy birthday or anniversary). They may alternatively forget to perform various tasks, make appointments or meet other obligations. All such situations could be remedied by merely giving individuals the ability to consult voice mail messages they have left for others.

SUMMARY OF THE INVENTION

It is therefore one object of the present invention to enable individuals to listen to outgoing voice mail messages. This and other objects of the present invention may be accomplished through systems and methods that record and play back outgoing voice mail messages by recording an audio file corresponding to a voice message being left by a user during an outgoing telephone call to a recipient, linking the audio file to contact information associated with the recipient, and providing the user access to the audio file through, for example, playback of the audio included in the file. Such systems and methods may be implemented through individual communications devices, such as an iPhone, through a telephone communications provider, or a combination of the same.

A communications device may be any device suitable for transmitting a communication (e.g., voice or data) as part of a communications operation, and has the ability to record audio. The communications operation may include audio communications (e.g., telephone), video communications (e.g., video conferencing), data communications (e.g., e-mail, instant messaging, text messaging), or any combination of the same. The communication may be sent via any suitable means for transmitting audio, video, or data (e.g., via a wired telephone line or via cable line, or via a wireless network).

The communication device may include a recorder that records the audio file corresponding to the voice message being left by the user during the outgoing telephone call made using the device. The device may also include a memory that stores the audio file as well as several contact files. Moreover, the device may include control circuitry that, among other things, links the audio file to at least one of the contact files associated with the recipient. Furthermore, the device may include an output that provides the user with content included in the audio file.

The telephone communications provider may be an entity that centrally controls or operates the telephone exchange through which calls are routed. The telephone exchange may be a private branch exchange that, for example, serves a particular business or office. Alternatively, the telephone exchange may be operated by a common carrier or a telephone company, or by a private entity such as a cellular telephone communications provider.

In some embodiments, the user may manually indicate that he or she is about to leave a voice mail message and may instruct the device or provider to record the voice message before the outgoing telephone call is made or during the outgoing telephone call. Such an instruction may be in the form of a voice command or a key input. In other embodiments, the communications device or the telephone communications provider may automatically detect when a user is leaving a voice mail message and start recording the message. The recording of the audio file may be initiated after the outgoing telephone call is diverted to voice mail. The same user may playback the voice mail message at any later time.

The user may be notified of the existence of a recording of an outgoing voice mail message. Such notification may be removed when the outgoing voice mail message is no longer outstanding. It may be said that the voice mail message is no longer outstanding when a communication by, or to, the recipient is attempted.

The user may be provided access to the audio file that includes the outgoing voice mail message in response to an incoming communication from, or an outgoing communication to, the recipient of the voice mail message. Such communication may be a call, a fax, an e-mail or a message (e.g., text message, multi-media message, instant message).

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
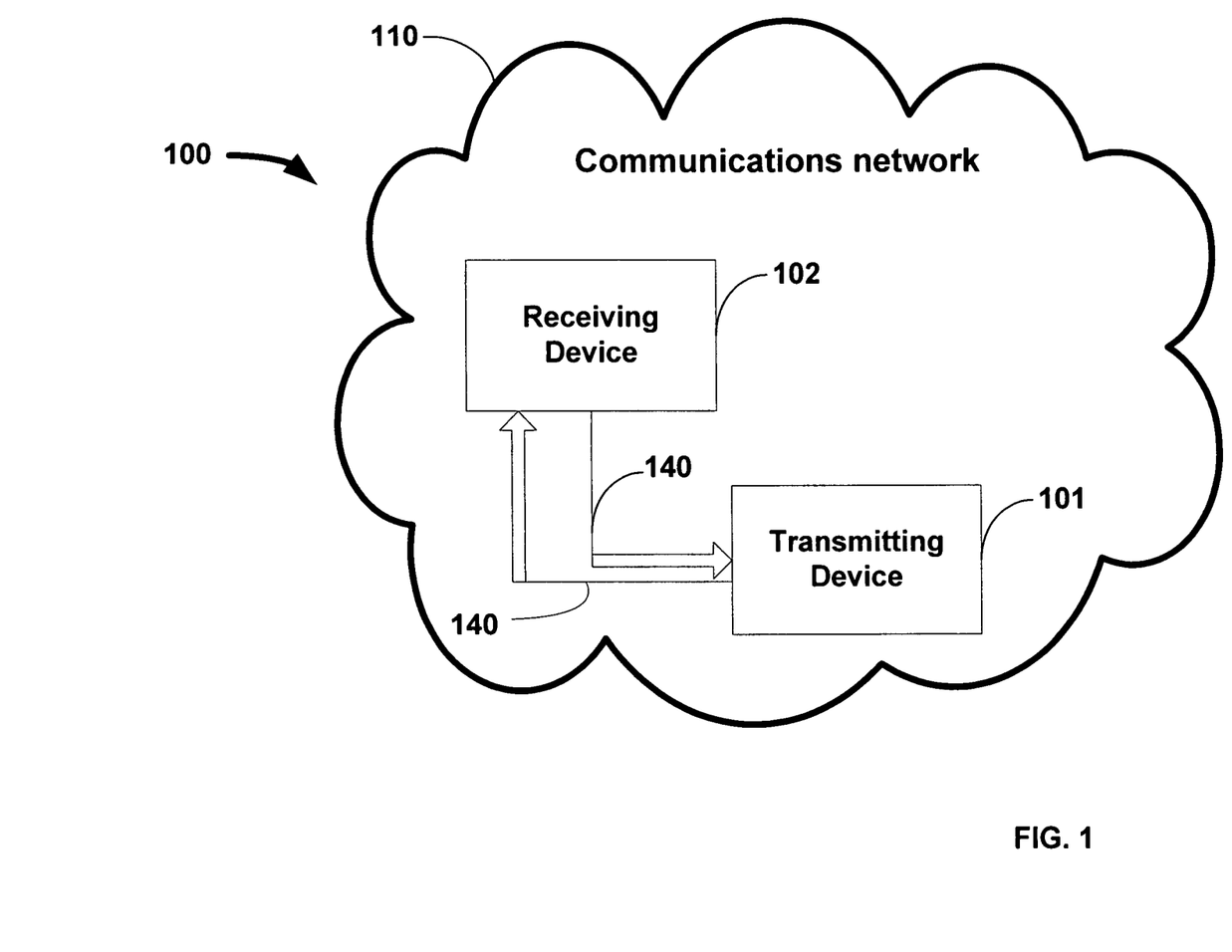
FIG. 1 is an illustrative schematic view of a communications system in accordance with certain embodiments of the present invention.

The systems and methods of the present invention may be applied to a communications system and communications device or devices described herein. FIG. 1 shows an illustrative schematic view of a communications system that may be compatible with a sender performing a communications operation with a recipient. Communications system 100 may include a communications device that transmits an outgoing communication (e.g., transmitting device 101) and communications network 110, which transmitting device 101 may use to initiate and conduct communications operations with other communications devices within communications network 110.

Communications system 100 may include a communications device that receives the outgoing communication from the transmitting device (e.g., receiving device 102). Although communications system 100 may include several transmitting devices 101 and receiving devices 102, only one of each is shown in FIG. 1 to simplify the drawing. Communications network may be a wireless network, a wired network, or any combination of the same.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof.

In some embodiments of the present invention, communications network 110 may support protocols used by wireless and cellular phones and personal e-mail devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP or LAN. In other embodiments, communications network 110 may support protocols used in wired telephone networks. Transmitting device 101 and receiving device 102, when located within communications network 110, may communicate over a bidirectional communication path such as path 140. Both transmitting device 101 and receiving device 102 may be capable of transmitting a communication and receiving a transmitted communication.

Transmitting device 101 and receiving device 102 may include any suitable device for transmitting and receiving communications. For example, transmitting device 101 and receiving device 102 may include a media player such as an iPod Touch available from Apple Inc., of Cupertino, Calif., a cellular telephone or a landline telephone, a personal e-mail or messaging device (e.g., a Blackberry® or a Sidekick®), an iPhone available from Apple Inc., pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires).

The communications transmitted and received may include any suitable form of communication, including, for example, voice communications (e.g., telephone calls), video communications (e.g., video conferencing), data communications (e.g., e-mails, text messages, media messages), or combinations of these. A communication may be transmitted directly from the transmitting device 101 to the receiving device 102 via the bidirectional communication path 140 of communications network 110. In some embodiments, a communication may be transmitted from the transmitting device to a server (not shown) within communications network 110. The server may be a remote or local server that transmit the communication to receiving device 102.

Figure 2:
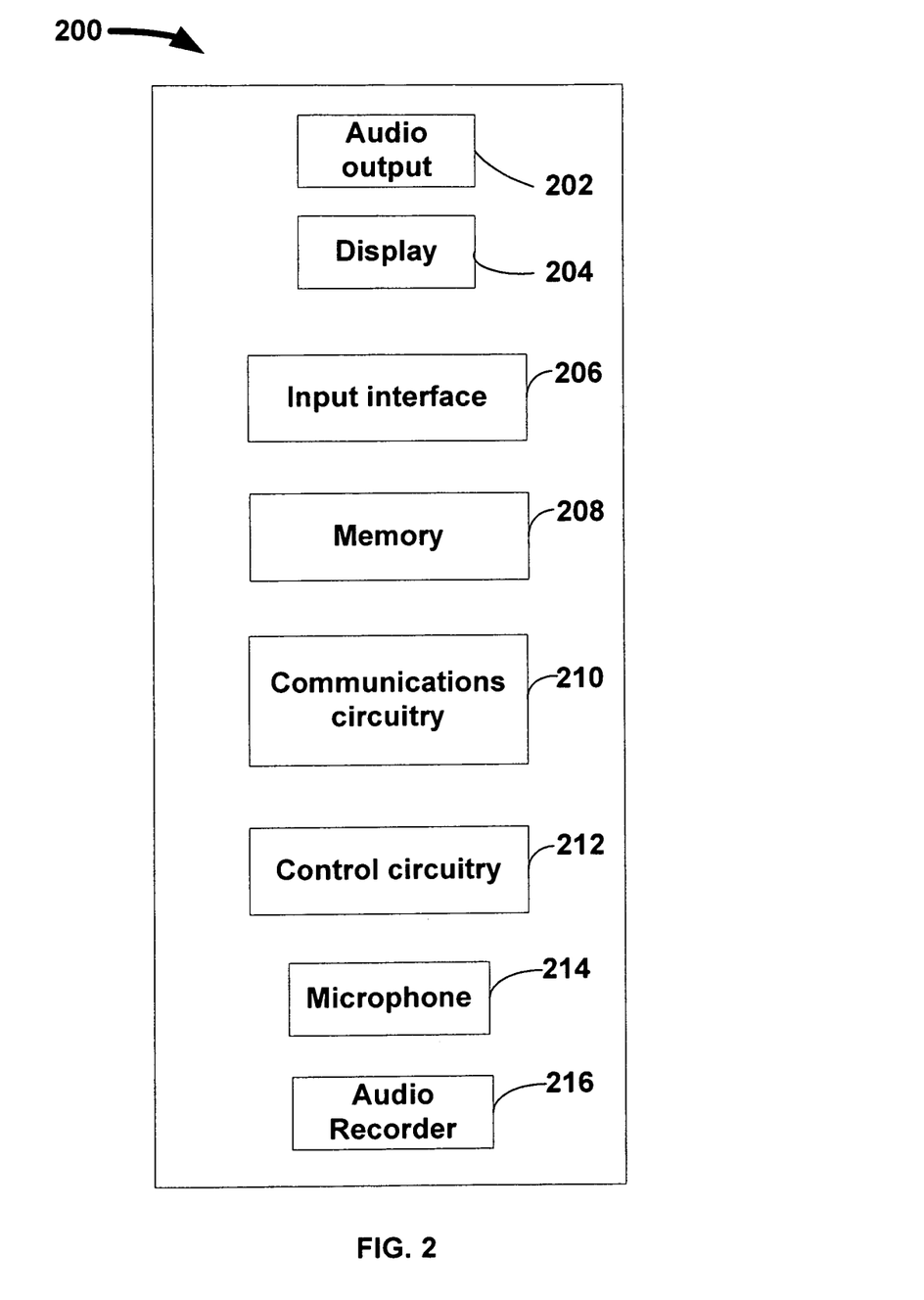
FIG. 2 is an illustrative block diagram of a communications device in accordance with certain embodiments of the present invention.

FIG. 2 shows a simplified block diagram of a communications device 200 that may be compatible with a sender performing a communications operation with a recipient. Both transmitting device 101 and receiving device 102 may include some or all of the features of communications device 200. Communications device 200 may include audio output 202, display 204, user input interface 206, memory 208, communications circuitry 210, control circuitry 212, microphone 214, audio recorder 216, and/or any other suitable components. Control circuitry 212 may communicate with the other components of the communications device 200. In some embodiments, control circuitry 212 may execute instructions stored in memory 208. Control circuitry 212 may also be operative to control the performance of communications device 200. Control circuitry 212 may also links an audio file to one or more contact files. Control circuitry 212 may include, for example, a processor, a microcontroller, and/or a bus (e.g., for sending instructions to the other components of communications device 200). In some embodiments, control circuitry 212 may also drive the display and audio output, as well as process inputs received from the user input interface 206. Control circuitry 212 may also include sound circuitry or graphics circuitry (e.g., an audio card and/or video card). Also, in some embodiments, where communications device 200 is capable of sending and receiving different types of communications (e.g., voice communications, such as telephone calls, video communications, such as video conferencing, and data communications, such as e-mails, text messages and media messages), control circuitry 212 may operate to communicate between the different applications used to perform the different types of communications operations.

With continuing reference to FIG. 2, memory 208 may include one or more different types of memory that can be used to perform device functions. For example, memory 208 may include cache, flash memory, ROM, RAM, and/or hybrid types of memory. Memory 208 may store contact information related to certain individuals, whereby each individual is preferably associated with one or more contact file A 'Contact' may refer to an individual associated with at least one contact file, or to the file itself. Different contacts may be grouped together according to certain attributes selected by a user. Contacts may be stored in the form of an address book.

In addition, memory 208 may store audio recorded through audio recorder 216, such as an outgoing voice message. Memory 208 may also store firmware for the device and its applications (e.g., operative system, user interface functions, and processor functions).

Communications device 200 may also include user input interface 206, audio output 202 and display 204 for providing a user with the ability to interact with communications device 200. For example, user input interface 206, audio output 202, and display 204 may provide an interface for a user to interact with an application running on control circuitry 212. User input interface 206 may take a variety of forms, such as a keyboard/keypad, trackpad, mouse, click wheel, button, stylus, or touch screen. User input interface 206 may also include one or more devices for user authentication (e.g., smart card reader, fingerprint reader, or iris scanner), as well as an audio input device (e.g., a microphone such as microphone 214) or a video input device (e.g., a camera or web cam) for recording video or still frames.

Audio output 202 may include any suitable audio component for providing audio to the user of communications device 200. For example, audio output 202 may include one or more speakers (e.g., mono or stereo speakers) built into communications device 200. Audio output 202 may include an audio component that is remotely coupled to communications device 200. For example, audio output 202 may include a headset, headphones or earbuds that may be coupled to communications device with a wire (e.g., coupled to communications device 200 with a jack) or wirelessly (e.g., Bluetooth® headphones or a Bluetooth® headset). In some embodiments of the present invention, the audio provided through audio output 202 may be a voice message that was recorded onto memory 208 or retrieved through communications network 110 of FIG. 1.

Display 204 of FIG. 2 may include a liquid crystal display (LCD), a touch screen display, or any other suitable system for presenting information or media to a user. Display 204 may be controlled by graphics circuitry, which may be included in control circuitry 212.

Communications circuitry 210 may be any suitable communications circuitry operative to connect communications device 200 to a communications network (e.g., communications network 110, FIG. 1) and to transmit communications (e.g., audio, video and/or data communications) from communications device 200 to other devices within the communications network. Communications circuitry 210 may be operative to interface with the communications network using any suitable communications protocol such as, for example, Wi-Fi (e.g., a 802.11 protocol), Bluetooth (registered trademark), high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 210 may be operative to create a communications network using any suitable communications protocol. For example, communications circuitry 210 may create a short-range communications network using a short-range communications protocol to connect to other devices. For example, communications circuitry 210 may be operative to create a local communications network using the Bluetooth® protocol to couple communications device 210 with a Bluetooth® headset. Communications circuitry 210 may also include a wired or wireless network interface card (NIC) configured to connect to the Internet or any other public or private network.

In some embodiments of the present invention, communications device 200 may contain more than one set of communications circuitry 210 in order to connect communications device 200 to more than one type of communications network (e.g., communications network 110, FIG. 1) and to perform more than one type of communications operation (e.g., audio, video and/or data communications) from communications device 200 to other devices within the communications network. Control circuitry 212 may operate to communicate between the different sets of communications circuitry 210 used to perform the different types of communications operations. Alternatively, communications device 200 may include more than one communications device, where each communications device contains its own communications circuitry 210 in order to connect to different types of communications networks (e.g., communications network 110, FIG. 1) and to perform different types of communications operation (e.g., audio, video and/or data communications). Control circuitry 212 of communications device 200 may operate to communicate between the different sets of communications circuitry 210 found in the multiple communications devices.

Microphone 214 may allow the user (e.g. a sender) to transmit audio (e.g., voice audio such as the content of a voice message) during a communications operation to a recipient (e.g., a receiver) of an outgoing communication. Microphone 214 may be incorporated in communications device 200, or may be remotely coupled to communications device 200. For example, microphone 214 may be incorporated in wired headphones, or microphone 214 may be incorporated in a wireless headset. Microphone 214 may be coupled to audio recorder 216 in order to record audio content through audio recorder 216 captured using microphone 214 onto memory 208.

Communications device 200 may include any other component suitable for performing a communications operation. For example, communications device 200 may include a power supply, ports or interfaces for coupling to a host device, a secondary input mechanism (e.g., an ON/OFF switch), or any other suitable component.

A user may direct communications device 200 to perform a communications operation, record an outgoing voice mail message, and/or play back such a message using any suitable approach. As one example, a user may receive a communications request from another device (e.g., an incoming telephone call, an e-mail or text message, or an instant message), and may initiate a communications operation by accepting the communications request. As another example, the user may initiate a communications operation by identifying another device and transmitting a request to initiate a communications operation (e.g., dialing a telephone number, sending an e-mail, typing a text message, or selecting a chat screen name and sending a chat request).

As yet another example, a sender may direct communications device 200 to initiate a recording of an outgoing voice message when the sender comes across a mailbox greeting of a recipient. That same sender may direct communications device 200 to initiate a playback of the recorder voice message at a later time.

Figure 3:
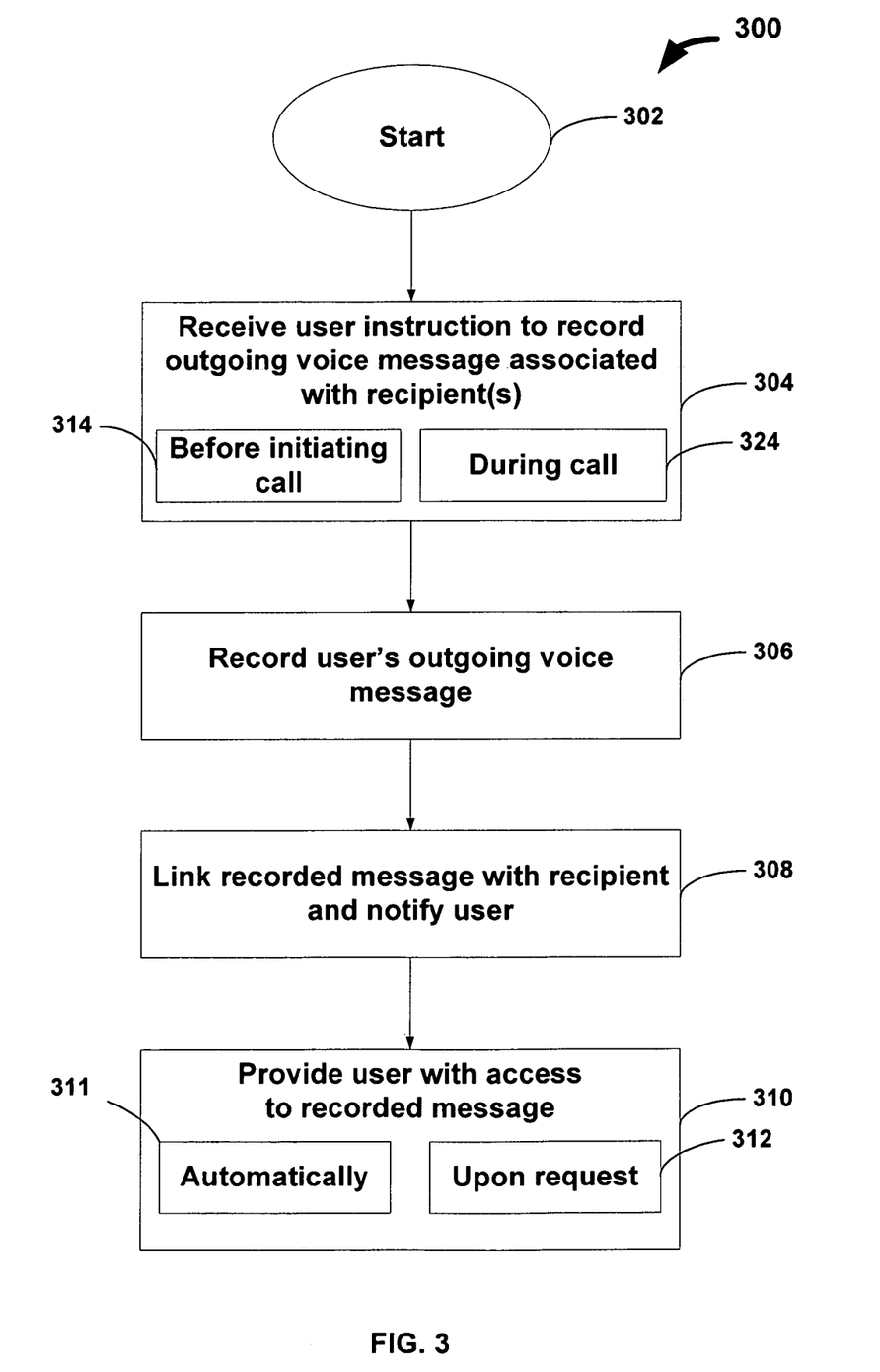
FIG. 3 is a flowchart of an illustrative process for recording and playing back an outgoing voice mail message in accordance with certain embodiments of the present invention.

FIG. 3 is a flowchart of an illustrative process for recording and playing back an outgoing voice mail message in accordance with certain embodiments of the invention. Boxes in this figure represent preferable events or steps that may occur but are not all necessarily required according to certain embodiments of the present invention.

Process 300 of FIG. 3 begins at step 302 with a user composing a communications operation, preferably a telephone call, on a transmitting device, such as device 101 of FIG. 1, or device 200 of FIG. 2. The user may select one or more recipients of the communications operation, who may be a contact. For example, the user may be directed to a display screen on display 204 of FIG. 2, which includes a recipient field. The user may input one or more recipients into the recipient field, or may select a subset of contacts or all contacts.

At step 304, the user may enter an instruction to record one or more outgoing voice messages associated with the selected recipient(s). Such an instruction may be directed to the device or may be directed to a telephone communications provider through the device. The telephone communications provider may be an entity that centrally controls or operates the telephone exchange through which calls are routed. The telephone exchange may be a private branch exchange that, for example, serves a particular business or office. Alternatively, the telephone exchange may be operated by a common carrier or a telephone company, or by a private entity such as a cellular telephone communications provider. The telephone exchange may be part of communications network 110 of FIG. 1.

The instruction to record the one or more outgoing voice messages may be received before a call to the one or more recipients is initiated as in substep 314, or after the call is initiated (i.e., during the call) as in substep 324.

At substep 314, the user may select one or more recipients for whom the user wishes to record voice messages he or she leaves. For example, the user may select a specific recipient from the user's contacts or may enter the recipient's contact information into the device. The user may alternatively select all stored contacts or a subset of such contacts, as opposed to selecting an individual contact. The user may select an existing group of contacts (e.g., work or professional contacts vs. personal contacts) or may create a group of contacts he or she wishes to have voice mail messages the user leaves for these contacts recorded. As such, the instruction received at step 304 may be a pre-selection of a number of potential recipients whom the user whishes to record voice messages he or she leaves for them. Alternatively, the user may select, as a default option, either to always record outgoing voice mail messages initiated using the device, or never record outgoing voice mail messages unless otherwise instructed by the user as described in connection with substep 324. Whether or not to record an outgoing message may be a feature that the user can enable at any time (e.g., before the user initiates a particular call or during the call).

At substep 324, after a call has been initiated and the user is given the option to leave a voice mail message for the recipient, the user may transmit an instruction to record the outgoing voice message. Such an instruction may be in the form of a voice command (e.g., the user speaks into microphone 214 of FIG. 2), or a manual command (e.g., the user enters a physical input using input interface 206 of FIG. 2) or any other prompt. In the former, the voice command may be a specific sound (e.g., letter or word) recognized by the device or the telephone communications provider for initiating the recording. In the latter, the manual command may be a button or key that activates audio recorder 216 of FIG. 2 or a key that generates a sound or tone recognized by the telephone communications provider.

With regards to substep 314, the operation of recording the outgoing voice mail message during the call may be automated. For example, recording may be initiated at the time a specific call is made, after a predetermined amount of time from when the call is made, at the time the call is diverted to voice mail, after a predetermined amount of time from when the call is diverted to voice mail, upon the generation of a sound (e.g., a tone that typically indicates that recording of a message has started) that is recognized by the device or by the telephone communications provider, or as a result of any other suitable trigger.

After step 304, the outgoing voice mail message may be recorded at step 306. This may be implemented through audio recorder 216 of FIG. 2 which records the voice mail message as an audio file onto memory 208 of FIG. 2. Recording may be initiated as described in step 304 and may end with either the call being terminated, a voice command or a manual command (as described above) being received, a sound being generated (e.g., a tone that typically indicates that recording of a message has stopped), any other prompt, or any combination of the same. The outgoing voice mail message may be recorded on the device itself (e.g., using microphone 214, audio recorder 216, control circuitry 212 and/or memory 208 of FIG. 2) or remotely using similar circuitry controlled by the telephone communications provider. The voice message may be recorded as an audio file during the outgoing telephone call. The audio file may be in a format that can be played back using conventional or specialized playback software and/or hardware. For example, the voice message may be stored in uncompressed form (e.g., as a WAV, AIFF or AU file) or in compressed form (e.g., as a FLAC, TTA, Apple Lossless, WMA, AAC, or MP3 file).

After an outgoing voice mail message has been recorded according to step 306, the audio file containing the message may be linked to the recipient of the message at step 308. This may be implemented through the device used to make the call or through the telephone communications provider. In the latter, the audio file may be linked to the number that was dialed during the communication. In the former, the audio file may be linked to the specific contact stored on the device (e.g., a name, telephone number, fax number, e-mail address, etc.). In case the number was not stored as a contact prior to recording of the message, a new contact may be created for linking with the file. Alternatively, the file may be linked to a shadow contact that is created and not displayed to the user, unless the user approves the creation of a contact. Any of these steps associated with linking the audio file with the recipient may be implemented through control circuitry 212 of FIG. 2.

In certain embodiments of the present invention, a notification may be displayed on the device at step 308 to indicate that a voice mail message was saved or that a recording of at least one outgoing voice mail message exists. The notification may be shown on one or more screens on display 204 of FIG. 2 and/or in conjunction with the contact associated with the recipient of the voice message. The notification may be a visual cue that may blink or flash or change color, a message displayed on the device, a vibration of the device, or any other suitable method that draws attention. Such a notification may be generated by the device in response to the creation of the audio file on the device, or may be generated remotely by the telephone communications provider. Alternatively, or as an additional measure, the user of the device may be alerted of the existence of an outgoing voice mail message when the user accesses his or her voice mailbox.

The notification may remain displayed to the user until the user enters at least any one command on the device for the first time after the voice message is recorded, until the user plays back the message, until the user manually selects to remove the notification, or until the voice mail message is no longer 'outstanding', as explained below.

At step 310, the user may be provided with access to the recorded message in order to listen to the outgoing voice message. As such, the voice mail message may be played back to the user. For example, the audio file stored on the device may be provided using audio output 202 of FIG. 2. Such playback may be implemented using systems and methods such as the ones described in commonly assigned U.S. application Ser. No. 11/786,848, filed Apr. 12, 2007, entitled "METHOD FOR AUTOMATIC PRESENTATION OF INFORMATION BEFORE CONNECTION", which is hereby incorporated by reference in its entirety. Alternatively, in case the audio file is stored remotely, the user can access the telephone communications provider's network through any suitable communications device. In such a situation, the audio file can be communicated to the user via e-mail, messaging, or playback.

The voice mail message may be played back to the user automatically (i.e., without a direct request for such playback by the user) at substep 311, or in response to the user's request at substep 312. At substep 311, in case the audio file was linked to the number that was dialed during the communication by the telephone communications provider's network, an incoming call from that same number may trigger playback of the voice mail message. In case the audio file was stored on the device, any one or more of the following events may trigger playback of the voice message at substep 311: an incoming call, fax, e-mail or message (e.g., text message, multi-media message, instant message) from a number or address recognized as pertaining to the contact (or shadow contact) linked to the audio file containing the message. Alternatively, an outgoing call, fax, e-mail or message (e.g., text message, multi-media message, instant message) from such a number or address may trigger playback of the voice message at substep 311.

In certain embodiments of the present invention, only the first instance of one of the events described above may trigger playback of the voice mail message. Alternatively, only the first call to or from such a number may trigger playback. The user may select which occurrence of any one(s) of these events may cause the message to not be automatically played back. So long as the message is caused to be automatically played back, it may be said that the message is 'outstanding' (i.e., no qualifying response was received from the intended recipient, and/or no further attempts were made to communicate with the same recipient). In other embodiments, any of the events may continue to trigger playback so long as the user has not played back the message.

At substep 312, the user may trigger playback of the voice mail message by entering appropriate commands through the device used to record the message or, if the message was stored at a remote location, through any device capable of communicating with the telephone communications provider.

Any one or more of the steps illustrated in FIG. 3 may be implemented through a communication device, a telephone communications provider, or a combination of both.

Thus, it can be seen that systems and methods that enable individuals to listen to outgoing voice mail messages they may have forgotten about are provided by recording such messages and playing them back under certain conditions.

Various configurations described herein may be combined without departing from the present invention. The above described embodiments of the present invention are presented for purposes of illustration and not of limitation. The present invention also can take many forms other than those explicitly described herein. Accordingly, it is emphasized that the invention is not limited to the explicitly disclosed systems and methods, but is intended to include variations to and modifications thereof which are within the spirit of the following claims.

What is claimed is:

1. A method for accessing outgoing voice mail messages on a user's wireless communication device, the method comprising:
   recording an audio file on a non-transitory memory, the audio file corresponding to a voice mail message that is left by a user to a recipient during an outgoing telephone call to the recipient after the outgoing telephone call is not answered by the recipient and is diverted to voice mail, the outgoing telephone call being initiated on the user's wireless communication device;
   linking the audio file to contact information associated with the recipient;
   notifying the user of an existence of the audio file, wherein notifying includes displaying on the wireless communication device a notification in conjunction with the contact information associated with the recipient; and
   providing the user access to the audio file on the wireless communication device, wherein providing the user access to the audio file comprises playing back audio included in the audio file to the user.

2. The method of claim 1 further comprising receiving an instruction from the user to record the voice mail message.

3. The method of claim 2 wherein the instruction is a selection of at least one potential recipient before the outgoing telephone call is made.

4. The method of claim 2 wherein the instruction is received during the outgoing telephone call.

5. The method of claim 2 wherein the instruction comprises a voice command.

6. The method of claim 2 wherein the instruction comprises a key input.

7. The method of claim 1 wherein the recording of the audio file is initiated after the outgoing telephone call is diverted to voice mail.

8. The method of claim 1 wherein the recording and the linking are implemented through the wireless communication device used to initiate the outgoing telephone call.

9. The method of claim 8 wherein the wireless communication device comprises a smart phone.

10. The method of claim 1 wherein the recording and the linking are implemented through a telephone communications provider.

11. The method of claim 1 wherein displaying on the wireless communication device the notification includes at least one of displaying a visual cue that blinks, displaying a visual cue that flashes, displaying a visual cue that changes colors, and displaying a message.

12. The method of claim 1 wherein the notifying the user ceases when the audio file is no longer outstanding.

13. The method of claim 12 wherein the audio file is no longer outstanding if (i) there has been a communication from, or to, the recipient, or (ii) there has been a playback of the audio file.

14. The method of claim 1, wherein the providing the user access to the audio file occurs in response to an incoming communication from the recipient.

15. The method of claim 14, wherein the incoming communication is selected from a group consisting of a call, a fax, an e-mail and a message.

16. The method of claim 1, wherein the providing the user access to the audio file occurs in response to an outgoing communication to the recipient.

17. The method of claim 16, wherein the outgoing communication is selected from a group consisting of a call, a fax, an e-mail and a message.

18. A communication device for accessing outgoing voice mail messages, the device comprising:

a recorder that records an audio file corresponding to a voice mail message that is left by a user to a recipient during an outgoing telephone call made using the device to the recipient after the outgoing telephone call is not answered by the recipient and is diverted to voice mail;

a non-transitory memory that stores the audio file and a plurality of contact files;

control circuitry including a processor, the control circuitry that links the audio file to at least one of the contact files associated with the recipient, and that displays a notification in conjunction with the at least one of the contact files associated with the recipient, wherein the notification notifies the user of an existence of the audio file; and an output that provides the user with content included in the audio file, wherein providing the user with content included in the audio file includes playing back audio included in the audio file to the user.

19. The communication device of claim 18, wherein the control circuitry is to display the notification by displaying one of a visual cue that blinks, a visual cue that flashes, a visual cue that changes colors, and a message.

20. The communication device of claim 18, wherein the control circuitry is to cease the display of the notification when the audio file is no longer outstanding.

21. The communication device of claim 20, wherein the audio file is no longer outstanding if (i) there has been a communication from, or to, the recipient, or (ii) there has been a playback of the audio file.

22. The communication device of claim 18, wherein the output provides the user access to the audio file in response to an incoming communication from the recipient.

23. The communication device of claim 18, wherein the output provides the user access to the audio file in response to an outgoing communication to the recipient.

\* \* \* \* \*